US011470997B2

(12) United States Patent
Ravazzani

(10) Patent No.: US 11,470,997 B2
(45) Date of Patent: Oct. 18, 2022

(54) CONTROL ASSEMBLY OF A SOLENOID VALVE, SOLENOID VALVE ASSEMBLY AND ASSOCIATED METHODS

(71) Applicant: R.P.E. S.R.L., Carbonate (IT)

(72) Inventor: Giuliano Ravazzani, Carbonate (IT)

(73) Assignee: R.P.E. S.R.L., Carbonate (IT)

( * ) Notice: Subject to any disclaimer, the term of this patent is extended or adjusted under 35 U.S.C. 154(b) by 783 days.

(21) Appl. No.: 16/348,388

(22) PCT Filed: Nov. 10, 2017

(86) PCT No.: PCT/IB2017/057052
§ 371 (c)(1),
(2) Date: May 8, 2019

(87) PCT Pub. No.: WO2018/087713
PCT Pub. Date: May 17, 2018

(65) Prior Publication Data
US 2021/0274963 A1    Sep. 9, 2021

(30) Foreign Application Priority Data

Nov. 11, 2016  (IT) .................. 102016000114253

(51) Int. Cl.
*A47J 31/46* (2006.01)
*A47J 31/58* (2006.01)
(Continued)

(52) U.S. Cl.
CPC ............. *A47J 31/461* (2018.08); *A47J 31/58* (2013.01); *F16K 31/0675* (2013.01); *F16K 37/0041* (2013.01)

(58) Field of Classification Search
CPC ..... A47J 31/461; A47J 31/58; F16K 31/0675; F16K 37/0041
See application file for complete search history.

(56) References Cited

U.S. PATENT DOCUMENTS 3,190,310 A * 6/1965 Honsinger ............ A47J 31/461
251/367
4,759,634 A * 7/1988 Blom .................... G07F 13/065
141/279

(Continued)

FOREIGN PATENT DOCUMENTS

| CN | 1862066 | 11/2006 |
|---|---|---|
| CN | 101344183 | 1/2009 |

(Continued)

*Primary Examiner* — Donnell A Long
(74) *Attorney, Agent, or Firm* — Leason Ellis LLP

(57) ABSTRACT

A control assembly of a solenoid valve for a delivery device; the control assembly comprising a first input configured to be coupled to a control device of the delivery device and to be supplied by a power supply voltage from the control device; a first output configured to be coupled to a second input of a solenoid valve; a control unit being coupled to the first input; and a drive unit coupled to the first output and to the control unit; the control unit being configured to detect a first voltage at the first input; the control unit being configured to control the drive unit so that, when the control unit detects a first voltage equal to a power supply voltage, the first output of the control assembly delivers: a rated voltage for a first period of time, and a hold voltage different from the rated voltage for a second period of time following the first period of time, and wherein the hold voltage is lower than the rated voltage.

19 Claims, 4 Drawing Sheets

(51) Int. Cl.
*F16K 31/06* (2006.01)
*F16K 37/00* (2006.01)

(56) References Cited

U.S. PATENT DOCUMENTS

| | | | |
|---|---|---|---|
| 7,284,570 B1 * | 10/2007 | Gracik | F16K 31/046 137/554 |
| 7,740,225 B1 | 6/2010 | Estelle | |
| 2002/0050579 A1 | 5/2002 | Near | |

FOREIGN PATENT DOCUMENTS

| | | |
|---|---|---|
| CN | 101521082 | 9/2009 |
| CN | 201306510 | 9/2009 |
| CN | 106015703 | 10/2016 |
| CN | 106015707 | 10/2016 |

* cited by examiner

CONTROL ASSEMBLY OF A SOLENOID VALVE, SOLENOID VALVE ASSEMBLY AND ASSOCIATED METHODS

CROSS-REFERENCE TO RELATED PATENT APPLICATIONS

This application is a U.S. National Phase Application under 35 U.S.C. § 371 of International Patent Application No. PCT/IB2017/057052, filed Nov. 10, 2017, which claims the priority of Italian Application No. 102016000114253, filed Nov. 11, 2016, all of which are incorporated by reference, as if expressly set forth in their respective entireties herein.

TECHNICAL FIELD

The present invention relates to a control assembly of a monostable solenoid valve, a solenoid assembly comprising said control assembly and relative control method. Furthermore, said invention relates to a delivery device comprising the solenoid assembly, in particular a coffee machine.

BACKGROUND ART

A monostable solenoid valve can be controlled in direct current or alternating current and is characterized by rated voltage and by rated current. In greater detail, when wishing to operate the solenoid valve, it is supplied with the rated voltage and the applied rated voltage is maintained for the whole time it is to be kept in operation. The terms "operating a solenoid valve" are understood to mean: closing a solenoid valve, if it is of the type that is normally open; or, opening a solenoid valve, if it is of the type that is normally closed. When rated voltage is applied to the solenoid valve, a rated current flows in the solenoid of the solenoid valve, inducing a magnetic field, which, in turn, moves a shutter, opening or closing the solenoid valve, depending on whether the solenoid valve is of the type that is normally closed or normally open. In a monostable solenoid valve, when the rated voltage is no longer applied, the shutter returns to its original position thanks to the action of a spring acting on the shutter.

One drawback of the prior art is that the solenoid valve can overheat in use, in particular during prolonged periods of use, causing a reduction in performance and/or malfunctioning and breakage. This problem is mostly encountered when the solenoid valve is used to regulate a flow of vapor or hot fluids and/or in hot environments. Generally, to limit the overheating of the solenoid valve, the maximum time of using the solenoid valve is limited in each operating cycle, however, the drawback is that it reduces the performance of the solenoid valve and the times of its use.

DISCLOSURE OF INVENTION

It is the object of the present invention to provide a control assembly of a solenoid valve, which reduces at least one of the drawbacks of the prior art.

A monostable solenoid control assembly is produced for a delivery device according to the present invention; the control assembly comprising a first input configured to be coupled to a control device of the delivery device and to be supplied by a power supply voltage from the control device; a first output configured to be coupled to a second input of a solenoid valve; a control unit being coupled to the first input; and a drive unit coupled to the first output and to the control unit; the control unit being configured to detect a first voltage at the first input; the control unit being configured to control the drive unit so that, when the control unit detects a first voltage equal to a power supply voltage, the first output of the control assembly delivers:
 a rated voltage for a first period of time, and
 a hold voltage different from the rated voltage for a second period of time following the first period of time, and wherein the hold voltage is lower than the rated voltage.

Thanks to the present invention, it is possible to drive a monostable solenoid valve using the rated voltage, for the first period of time, to open or close the solenoid valve; and then the hold voltage, for the second period of time, which is lower than the rated voltage, and which keeps the solenoid valve open or closed. Using the hold voltage lower than the rated voltage, a hold current is also used, which is lower than the rated current, guaranteeing reduced overheating of the solenoid valve, lower consumption and a longer lifespan of the solenoid valve. Thanks to the reduced overheating, the solenoid valve performs better because the solenoid valve can operate for a longer period of time and/or under greater pressure and/or for a duty cycle of up to 100%.

According to a preferred embodiment, the rated voltage is equal to the power supply voltage.

According to another preferred embodiment, the control unit is coupled to the first output to measure the current delivered to the solenoid valve.

According to another preferred embodiment, the control assembly is configured to drive the monostable solenoid valve with a current control, preferably the control unit is configured to determine the value of the hold voltage based on the measurement of the current delivered to the solenoid valve, in particular the control unit defines the hold voltage value such that the value of the current delivered is equal to the value of a hold current.

According to another preferred embodiment, the control unit is configured to monitor the current delivered to detect malfunctioning of the solenoid valve.

According to another preferred embodiment, the control unit is configured to drive the drive unit so that the first voltage and/or current delivered are equal respectively to a voltage and/or reset current respectively different from the rated voltage and from the hold voltage and/or from the rated current and from the hold current.

It is another object of the present invention to produce a solenoid assembly, which reduces at least one of the drawbacks of the prior art.

A solenoid assembly is produced according to the present invention comprising a control assembly, produced according to any one of the claims from 1 to 7, and a monostable solenoid valve connected to the first output of the control assembly for being driven by the control assembly.

It is another object of the present invention to produce a fluid delivery device, which reduces at least one of the drawbacks of the prior art.

A fluid delivery device is produced according to the present invention comprising a monostable solenoid valve for delivering fluid and having a second input for being supplied by an electrical voltage; a control device configured for emitting a power supply voltage through a second output for operating the solenoid valve; and a control assembly produced according to one of the claims from 1 to 7, wherein the first input of the control assembly is connected to the second output of the control device and the first output of the control assembly is connected to the second input of the solenoid valve for supplying the solenoid valve with the rated voltage or with the hold voltage when it receives the supply voltage at the first input, preferably the rated voltage being equal to the supply voltage.

It is another object of the present invention to provide a control method for controlling a monostable solenoid valve.

A control method is provided according to the present invention for controlling a monostable solenoid valve of a delivery device; the control method comprising the steps of: receiving a power supply voltage, preferably of a constant value, from a control device of the delivery device; delivering a rated voltage to the solenoid valve for a first time interval, when the control device delivers the supply voltage; delivering a hold voltage to the solenoid valve for a second time interval following the first time interval, wherein the hold voltage is lower than the rated voltage, preferably the rated voltage being equal to the power supply voltage.

According to a preferred embodiment, the method comprising the step of detecting the current delivered to the solenoid valve.

According to a preferred embodiment, the method comprises the step of driving the solenoid valve with a current control, when the control device delivers the power supply voltage, preferably the method comprises the step of defining the value of the hold voltage based on the current delivered to the solenoid valve, preferably defining the hold voltage such that the current delivered to the solenoid valve is equal to a hold current.

According to a preferred embodiment, the method comprises the step of detecting malfunctioning based on the measurement of the current delivered to the solenoid valve.

According to a preferred embodiment, the method comprises the steps of delivering a voltage and/or reset current to the solenoid valve respectively different from the rated voltage and from the hold voltage and/or from the rated current and from the hold current, when it detects malfunctioning of the solenoid valve.

It is another object of the present invention to provide a method for modifying a delivery device, which reduces at least one of the drawbacks of the prior art.

A method for modifying a delivery device is provided, according to the present invention, wherein the delivery device comprises a monostable solenoid valve having a second input and a control device of the solenoid valve having a second output connected to the second input of the solenoid valve, the method comprises the steps of: disconnecting the second output of the control device from the second input of the solenoid valve, connecting the second output of the control device to the first input of a control assembly produced according to any one of the claims from 1 to 7, connecting the first output of the control assembly to the second input of the solenoid valve.

It is another object of the present invention to provide a method for increasing the performance of a delivery device, which reduces the drawbacks of the prior art.

A method is provided according to the present invention for increasing the performance of a delivery device.

It is provided, according to the present invention, to increase the performance of a delivery device, wherein the delivery device comprises a monostable solenoid valve having a second input, and a control device of the solenoid valve having a second output, configured to supply the solenoid valve with a power supply voltage, which is preferably constant; the method comprises the steps of: interposing a control assembly produced according to claims from 1 to 7 between the second output of the control device and the second input of the solenoid valve, in particular, connecting the second output of the control device to the first input of the control assembly, and the first output of the control assembly to the second input of the solenoid valve.

BRIEF DESCRIPTION OF THE DRAWINGS

Other features and advantages of the present invention will become clear from the following description of a non-limiting example of an embodiment, with reference to the appended drawings, wherein.

BEST MODE FOR CARRYING OUT THE INVENTION

Figure 1:
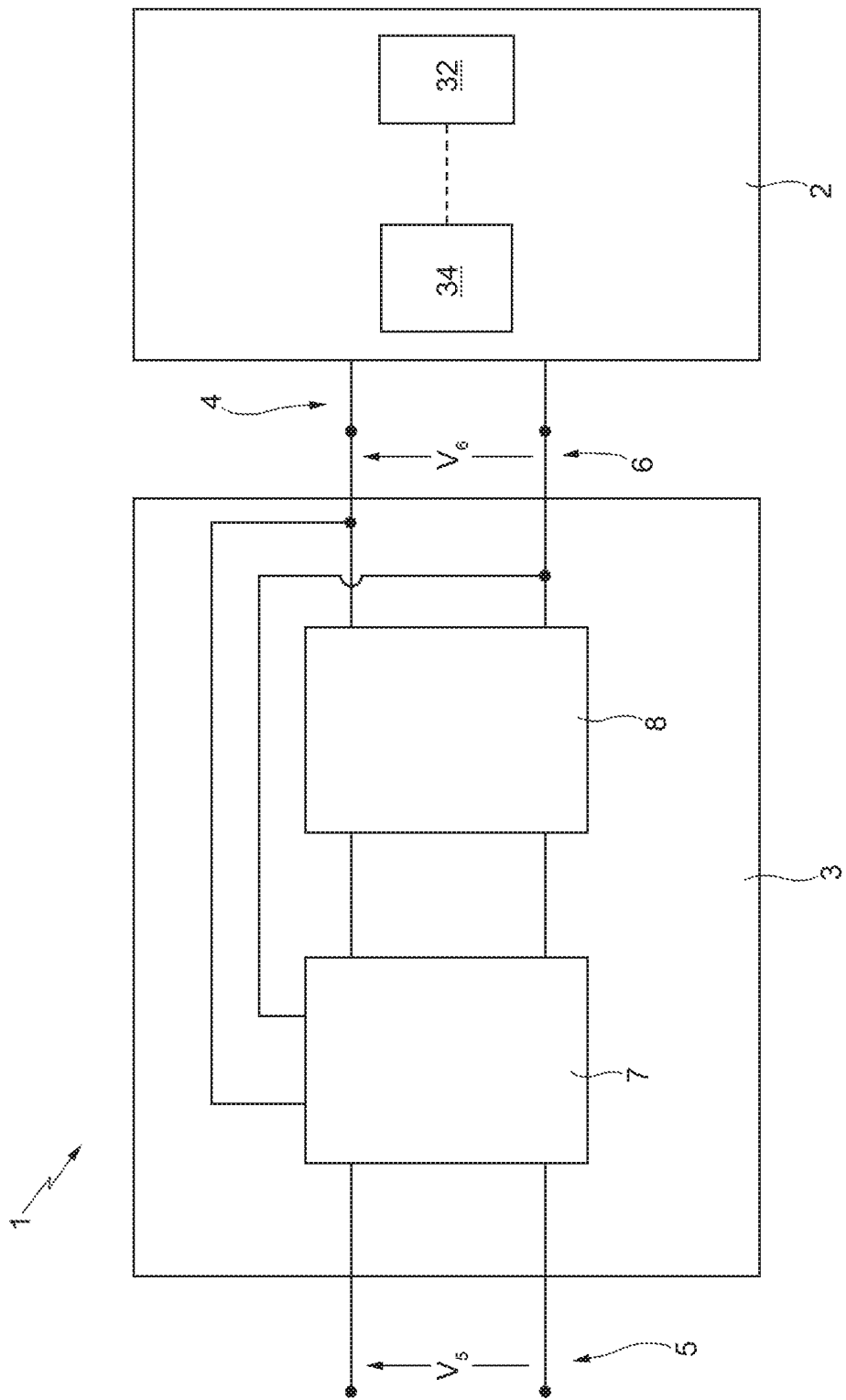
FIG. 1 is a block diagram of a solenoid assembly produced according to the present invention and comprising a control assembly produced according to the present invention.
Figure 2:
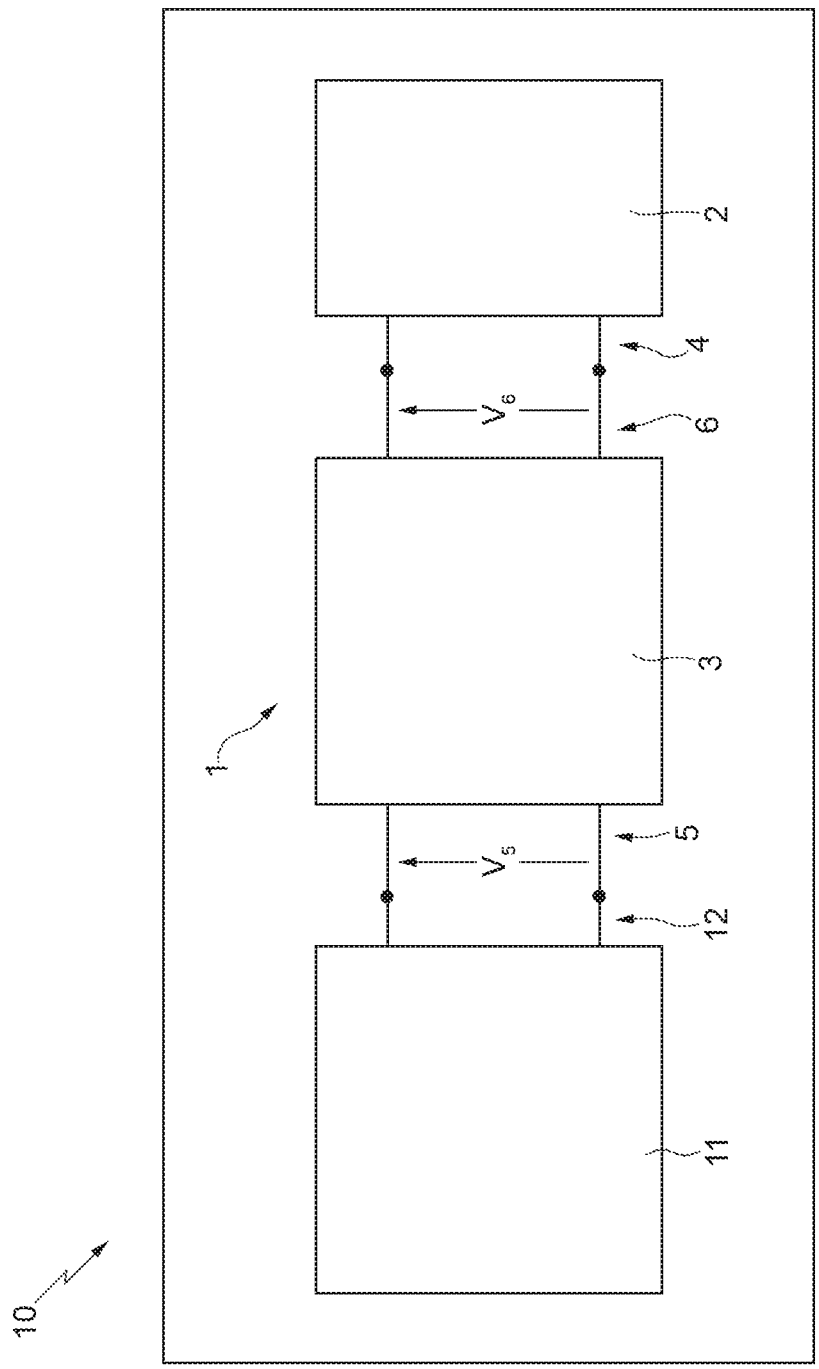
FIG. 2 is a block diagram of a fluid delivery device, in particular a coffee machine, comprising the solenoid assembly in FIG. 1.
Figure 3:
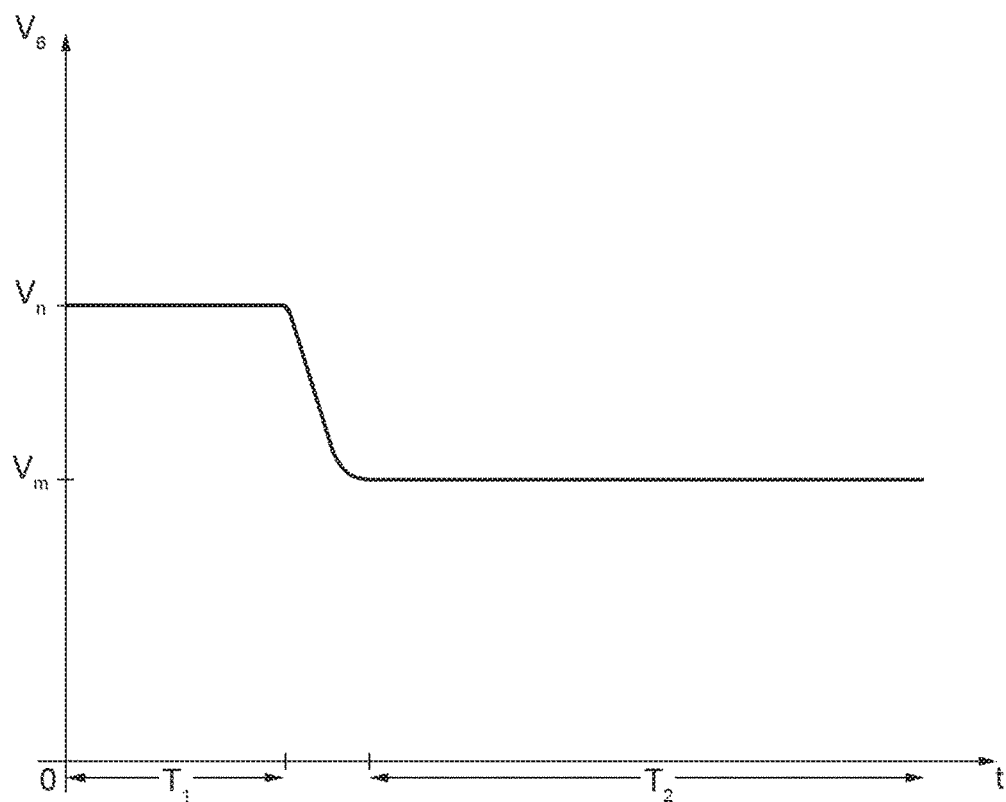
FIG. 3 is a diagram illustrating the voltage values at the output of the control assembly in FIG. 1.
Figure 4:
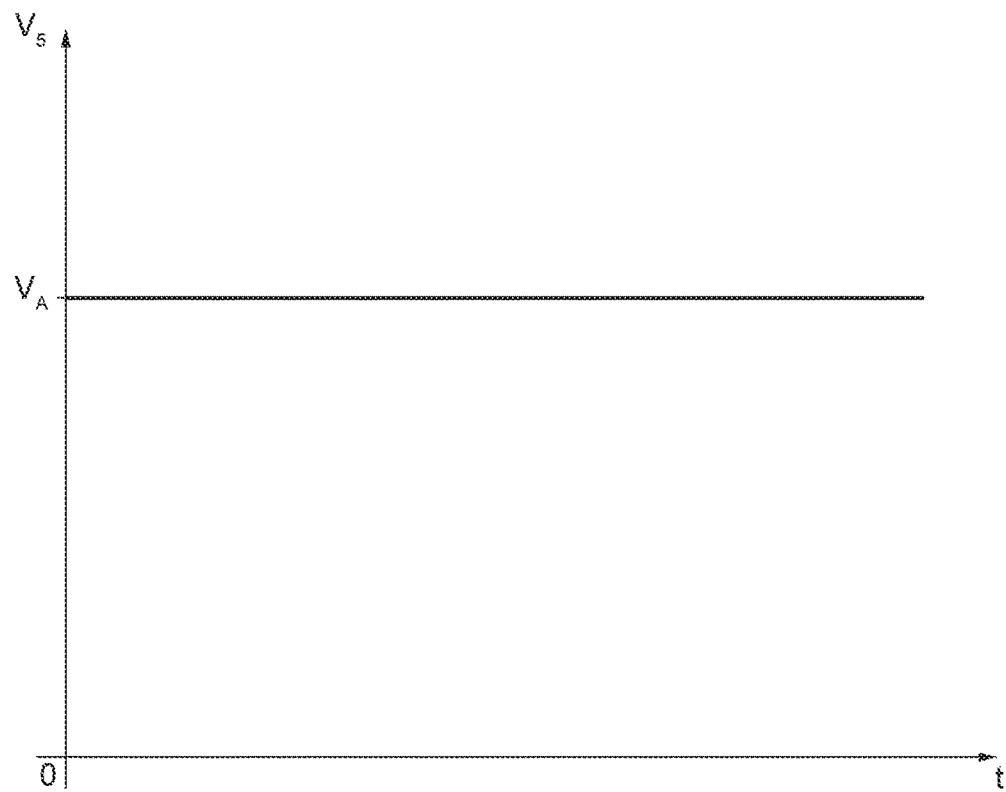
FIG. 4 is a diagram illustrating the voltage values at the input of the control assembly in FIG. 1.

With reference to FIG. 1, 1 globally defines a solenoid assembly for a fluid delivery device 10 (FIG. 2). The solenoid assembly 1 comprises a monostable solenoid valve 2 and a control assembly 3 of the monostable solenoid valve 2.

The monostable solenoid valve 2 comprises a power supply input 4 for receiving voltage and electric current. In greater detail, the monostable type solenoid valve 2 requires a power supply for being opened or closed depending on whether it is of a normally closed type or a normally open type, and it requires a power supply for the whole time the solenoid valve is to be kept open or closed. When the monostable type solenoid valve 2 is no longer supplied, it returns to its original open or closed position by itself, depending on whether it is of the type that is normally open or normally closed.

Figure 5:
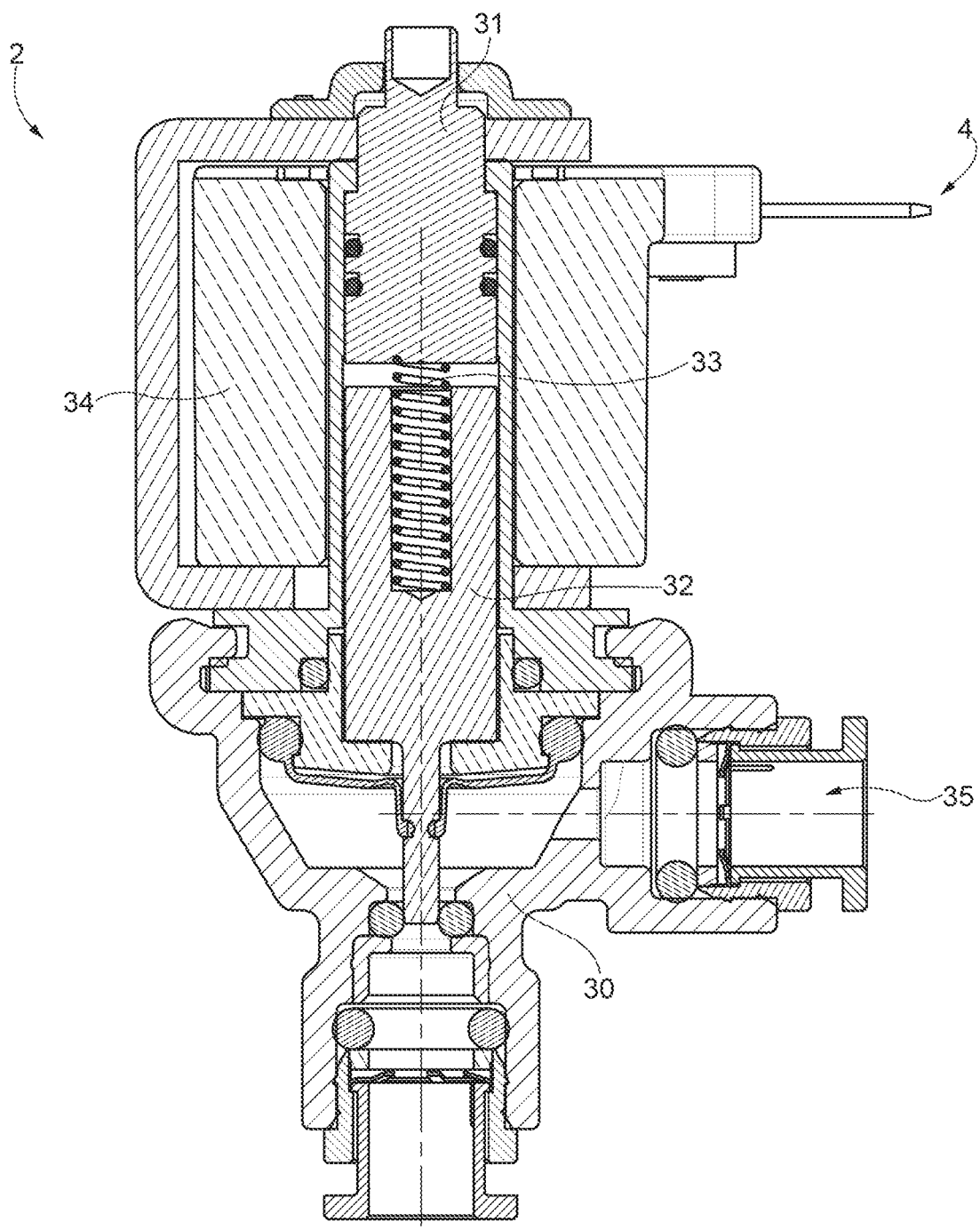
FIG. 5 is a section view of a detail of the solenoid assembly.

With reference to FIG. 5, the monostable solenoid valve 2 comprises a valve body 30, a fixed element 31, a movable shutter 32 having at least one portion made of ferromagnetic material, an elastic element 33, a solenoid 34 and a channel 35 where some fluid flows selectively.

The elastic element 33 is interposed between the movable shutter 32 and the fixed element 31 to keep the shutter 32 in a closed position in the channel 35 when the solenoid 34 is not supplied by current.

When the solenoid 34 is supplied by current, the shutter 32 is moved by a magnetic field produced by the solenoid 34, to allow or prevent the passage of fluid along the channel 35. The monostable solenoid valve 2 illustrated in FIG. 5 is of the type, which is normally closed. The invention also applies to all types of monostable solenoid valves, such as, for example monostable solenoid valves, which are normally open or normally closed, direct or indirect monostable solenoid valves, both those that are normally open and those that are normally closed.

The control assembly 3 comprises a power supply input 5 for receiving a voltage V5 and an electric current and an output 6 for delivering a voltage V6 and an electric current.

The output 6 is connected to the input 4 of the solenoid valve 2.

The control assembly 3 comprises a control unit 7 coupled to the input 4, and a drive unit 8 coupled to the output 6 and to the control unit 7. Furthermore, the control unit 7 is coupled to the output 6 to detect the current delivered to the solenoid valve 2 at the output 6.

The valve assembly 2 described above can be used in the fluid delivery device 10 in FIG. 2.

With reference to FIG. 2 and, in greater detail, the fluid delivery device 10 comprises a control device 11 and the solenoid assembly 1. In a preferred embodiment of the present invention, the fluid delivery device 10 delivers vapor or hot liquids. In a preferred embodiment, the fluid delivery device 10 is comprised in a coffee machine.

In another preferred embodiment, the fluid delivery device 10 is comprised in a distributor for hot drinks, filtered and/or carbonated water.

In another preferred embodiment, the fluid delivery device 10 is comprised in industrial floorwashers.

In greater detail, the control device 11 comprises an output 12 for providing voltage and electric current, which is connected to the input 5 of the control assembly 3. The control device 11 is configured to deliver a power supply voltage VA to the output 12 when it is necessary to operate the solenoid valve 2.

In greater detail, the control device 11 is configured to deliver a voltage at the output 12, which is only equal to two values: a) a power supply voltage value Va, which is preferably constant, when the control device 11 wants to operate the solenoid valve 2, and for the whole time the solenoid valve 2 is to be kept in operation 2; b) a voltage value at the output 12 equal to zero, when it doesn't want to operate the solenoid valve 2. By operating the solenoid valve 2 we mean: allowing the passage of fluid, if the solenoid valve 2 is of a normally closed type; or preventing the passage of fluid, if the solenoid valve 2 is of a normally open type.

The control assembly 3 is configured to be supplied from the control device 12 by means of the power supply voltage Va provided at the input 5 when the control device 12 intends to operate the solenoid valve 2. Furthermore, the control assembly 3 is configured to provide a voltage V6 to the solenoid valve 2, at the output 6, with a value equal to a rated voltage Vn or a hold voltage Vm, when it detects a voltage V5 at the input 5 equal to the power supply voltage VA.

The hold voltage value Vm is comprised in an interval, which goes from 15% to 50% of the rated voltage value Vn. In a preferred version of the present invention, the hold voltage value Vm is comprised in an interval, which goes from 15% to 30% of the rated voltage value Vn.

In greater detail, the control unit 7 is configured to detect the voltage V5 at the input 5 and, when the voltage V5 is equal to the power supply voltage Va, control the drive unit 8, so that the voltage V6 at the output 6 is: for a first period of time T1, equal to the rated voltage Vn; and then, for a second period of time T2, equal to the hold voltage Vm. The second period of time T2 temporally follows the first period of time T1. The hold voltage Vm is lower than the rated voltage Vn. In other words, the control assembly 3 is interposed between the control device 11 and the solenoid valve 2, and is configured so that: when the control device 11 delivers the power supply voltage VA to operate the solenoid valve 2, the control assembly 3 delivers first the rated voltage Vn for the first time interval T1, and then the hold voltage Vm for the second time interval T2 to the solenoid valve 2. The second time interval T2 lasts until the control device 3 delivers the power supply voltage Va.

In greater detail, the control unit 7 is configured to determine the rated voltage value Vn based on the current delivered to the solenoid valve 2, in particular, the control unit 7 defines the rated voltage value Vn, so that the value of the current delivered is equal to the value of a predetermined rated current memorized in the control unit 7. In other words, the control unit 7 carries out a current check of the solenoid valve 2.

In a preferred version of the present invention, the rated voltage Vn is equal to the power supply voltage Va.

In greater detail, the control unit 7 is configured to determine the hold voltage value Vm based on the current delivered to the solenoid valve 2, in particular, the control unit 7 defines the hold voltage value Vm, so that the value of the current delivered is equal to the value of a predetermined hold current memorized in the control unit 7. In other words, the control unit 7 carries out a current check of the solenoid valve 2.

The hold current value Im is comprised in an interval, which goes from 15% to 50% of the rated current value In. In a preferred version of the present invention, the hold current value Im is comprised in an interval, which goes from 15% to 30% of the rated current value In.

Furthermore, in a preferred embodiment, the control unit 7 is configured to drive the drive unit 8 by means of a pulse width modulation PWM and the drive unit 8 provides the solenoid valve 2 with the rated voltage Vn and the hold voltage Vm with a pulse width modulation.

Thanks to the present invention, when the control assembly 3 supplies the solenoid valve 2 with the rated voltage Vn, it allows the shutter 32 of the solenoid valve 2 to move from open to closed or from closed to open. Subsequently, when the control assembly 3 supplies the solenoid valve 2 with the hold voltage Vm it keeps the shutter 32 in the predetermined open or closed position.

In a preferred version of the present invention, the control unit 7 is configured to detect the current delivered and detect malfunctioning of the solenoid valve 2 based on the monitored current delivered. Furthermore, if the control unit 2 detects malfunctioning, it is configured to drive the drive unit 8, so that the voltage V6 and/or the current delivered at the output 6 are equal to a voltage and/or a reset current respectively, which are different from the rated voltage Vn and from the hold voltage Vm and/or from the rated current and from the hold current, respectively.

The control assembly 3 can also be used in a delivery device 10, which is already in operation, to modify it and increase its performance. In particular, the control assembly 3 can be used in a delivery device 10, which comprises a solenoid valve 2 and a control device 11 connected to the solenoid valve 2, wherein the control device 11 is configured to supply the solenoid valve 2 with a constant and non-varying power supply voltage Va. In other words, the control device 11 is configured to supply only two voltage values at the output 12: a value equal to the power supply voltage Va, when it is necessary to operate the solenoid valve 2, and a voltage value equal to zero when it is not necessary to operate the solenoid valve 2. In this case, the control assembly 3 is installed into the delivery device 10, disconnecting the output 12 of the control device 11 from the input 4 of the solenoid valve 2, and connecting the output 12 of the control device 10 to the input 5 of the control assembly 3, and connecting the output 6 of the control assembly 3 to the input 4 of the solenoid valve 2. In this way, the control assembly 3 guarantees an increase in performance of the previously operating delivery device 10 since the solenoid valve 2 will heat up less, consume less current, operate for longer periods of time and work under greater pressure.

In general, the control assembly 3 can be used to increase the performance of any delivery device 10 having a control device 10, as previously illustrated. In this case, the control assembly 3 is interposed between the output 12 of the control device 11 and the input 4 of the solenoid valve 2, in particular connecting the output 12 of the control device 5 to the input 5 of the control assembly 3 and the output 6 of the control assembly 3 to the input 4 of the solenoid valve 2.

Thanks to the present invention, the control assembly 3 increases the performance of the solenoid valve 2 and of the delivery device 10 in general.

Finally, it is clear that modifications and variations can be made to the present invention without going beyond the scope of the appended claims.

The invention claimed is:

1. A method for modifying a delivery device, wherein the delivery device (10) comprises a monostable solenoid valve (2) having a second input (4) and a control device (11) of the solenoid valve (2) having a second output (12) connected to the second input (4) of the solenoid valve (2), the method comprising the steps of: disconnecting the second output (12) of the control device (11) from the second input (4) of the solenoid valve (2), connecting the second output (12) of the control device (11) to a first input (5) of a control assembly (3) of a monostable solenoid valve for a delivery device, connecting a first output of the control assembly (6) to the second input (4) of the solenoid valve (2); wherein the control assembly (3) comprises the first input (5) configured to be coupled to a control device (11) of the delivery device (10) and to be supplied by a power supply voltage (Va) from the control device (11); the first output (6) configured to be coupled to a second input (4) of a monostable solenoid valve (2); a control unit (7) being coupled to the first input (5); and a drive unit (8) coupled to the first output (6) and to the control unit (7); the control unit (7) being configured to detect a first voltage (V5) at the first input (5); the control unit (7) being configured to control the drive unit (8) so that, when the control unit (7) detects a first voltage (V5) equal to a power supply voltage (Va), the first output (6) of the control assembly (3) delivers:
A rated voltage (Vn) for a first period of time (T1), and
A hold voltage (Vm) different from the rated voltage (Vn) for a second period of time (T2) following the first period of time (T1), and wherein the hold voltage (Vm) is lower than the rated voltage (Vn).

2. The method of claim 1, wherein the rated voltage (Vn) is equal to the power supply voltage (Va).

3. The method of claim 1, wherein the control unit (7) is coupled to the first output (6) to measure the current delivered to the solenoid valve (2).

4. The method of claim 3, wherein the control assembly (3) is configured to drive the solenoid valve (2) with a current control.

5. The method of claim 4, wherein the control unit (7) is configured to determine the hold voltage value (Vm) based on the measurement of the current delivered to the solenoid valve (2).

6. The method of claim 5, wherein the control unit (7) defines the hold voltage value (Vm) such that the value of the current delivered is equal to the value of a hold current.

7. The method of claim 4, preferably wherein the control unit (7) is configured to determine the rated voltage (Vn) based on the measurement of the current delivered to the solenoid valve (2).

8. The method of claim 7, in particular wherein, the control unit (7) defines the rated voltage value (Vn), such that the value of the current delivered is equal to the value of a rated current.

9. The method of claim 3, the control unit (7) is configured to monitor the current delivered to detect malfunctioning of the solenoid valve (2).

10. The method of claim 9, the control unit (7) is configured to drive the drive unit (8), so that the first voltage (V6) and/or current delivered are equal respectively to a voltage and/or to a reset current respectively different from the rated voltage (Vn) and from the hold voltage (Vm) and/or from the rated current and from the hold current.

11. A control method to control a solenoid valve of a delivery device; the control method comprising the steps of: receiving a power supply voltage (Va), preferably of a constant value, from a control device (11) of the delivery device (10); delivering a rated voltage (Vn) for a first time interval (T1) to the monostable solenoid valve (2), when the control device (11) delivers the power supply voltage (Va); delivering a hold voltage (Vm) to the solenoid valve (2) for a second time interval (T2) following the first time interval (T1), wherein the hold voltage (Vm) is lower than the rated voltage (Vn); comprising the step of detecting the current delivered to the monostable solenoid valve (2); comprising the steps of detecting malfunctioning based on the measurement of the current delivered to the solenoid valve (2); delivering, to the solenoid valve (2), a voltage and/or a reset current respectively different from the rated voltage (Vn) and from the hold voltage (Vm) and/or from the rated current and from the hold current, when malfunctioning of the solenoid valve (2) is detected.

12. The control method of claim 11, comprising the step of driving the solenoid valve (2) with a current control, when the control device (11) delivers the power supply voltage (Va), preferably the method comprises the step of defining the hold voltage value (Vm) based on the current delivered to the solenoid valve (2), preferably defining the hold voltage (Vm), such that the current delivered to the solenoid valve (2) is equal to a hold current.

13. A method for increasing the performance of a delivery device, wherein the delivery device (10) comprises a monostable solenoid valve (2) having a second input, and a control device (11) of the solenoid valve (2) having a second output (12) configured to supply the solenoid valve (2) with a power supply voltage (Va) the method comprises the steps of: interposing a control assembly (3) of a monostable solenoid valve for a delivery device between the second output (12) of the control device (11) and the second input (4) of the solenoid valve (2), in particular connecting the second output (12) of the control device (11) to a first input (5) of the control assembly (3), and a first output (6) of the control assembly (3) to the second input (4) of the solenoid valve (2); wherein the control assembly (3) comprising the first input (5) configured to be coupled to a control device (11) of the delivery device (10) and to be supplied by a power supply voltage (Va) from the control device (11); the first output (6) configured to be coupled to a second input (4) of a monostable solenoid valve (2); a control unit (7) being coupled to the first input (5); and a drive unit (8) coupled to the first output (6) and to the control unit (7); the control unit (7) being configured to detect a first voltage (V5) at the first input (5); the control unit (7) being configured to control the drive unit (8) so that, when the control unit (7) detects a first voltage (V5) equal to a power supply voltage (Va), the first output (6) of the control assembly (3) delivers:

A rated voltage (Vn) for a first period of time (T1), and

A hold voltage (Vm) different from the rated voltage (Vn) for a second period of time (T2) following the first period of time (T1), and wherein the hold voltage (Vm) is lower than the rated voltage (Vn).

14. The method of claim 13, wherein the rated voltage (Vn) is equal to the power supply voltage (Va).

15. The method of claim 13, wherein the control unit (7) is coupled to the first output (6) to measure the current delivered to the solenoid valve (2).

16. The method of claim 15, wherein the control assembly (3) is configured to drive the solenoid valve (2) with a current control, the control unit (7) is configured to determine the hold voltage value (Vm) based on the measurement of the current delivered to the solenoid valve (2).

17. The method of claim 15, wherein the control assembly (3) is configured to drive the solenoid valve (2) with a current control, the control unit (7) is configured to determine the rated voltage (Vn) based on the measurement of the current delivered to the solenoid valve (2).

18. The method of claim 15, the control unit (7) is configured to monitor the current delivered to detect malfunctioning of the solenoid valve (2).

19. The method of claim 18, the control unit (7) is configured to drive the drive unit (8), so that the first voltage (V6) and/or current delivered are equal respectively to a voltage and/or to a reset current respectively different from the rated voltage (Vn) and from the hold voltage (Vm) and/or from the rated current and from the hold current.

* * * * *